UNITED STATES PATENT OFFICE 2,650,895

SPRAY DRIED VITAMIN A AND D EMULSION

John Clarence Wallenmeyer, Francis Guy McDonald, and Robert Lloyd Henry, Evansville, Ind., assignors to Mead Johnson & Company, Evansville, Ind., a corporation of Indiana No Drawing. Application February 24, 1947, Serial No. 730,562

12 Claims. (Cl. 167—81)

This invention relates to vitamin preparations and methods of making the same. More particularly, it relates to a vitamin preparation in which the vitamins are present in a physically stable dispersed condition, encapsulated by a protective medium which itself is not subject to harmful deterioration.

Recent clinical investigations have shown that premature infants, as well as individuals suffering from diseases and conditions affecting intestinal absorption, assimilate vitamin A in oil carriers very poorly. However, when given massive doses of a highly dispersed form of vitamin A in a water soluble carrier, such as propylene glycol, or water emulsions, rapid and large increases in the blood serum level of vitamin A result in these individuals. Even normal individuals appear to assimilate water dispersed forms of vitamin A somewhat beter than oil carrier forms.

Due to the impracticability of assaying vitamin D in the blood serum, and until the present lengthy and involved methods of evaluating the results of such measurements can provide the necessary information, it is unknown whether or not highly dispersed forms of vitamin D will be more readily assimilated than that contained in oil solutions. It is logical to assume, however, that the assimilation of vitamin D may correspond to that of vitamin A when administered in the same medium and under the same conditions.

Several forms of vitamin preparations containing the oil soluble vitamins in a dispersed condition have been developed in the past. One of these preparations is in the form of small beadlets containing dispersed particles of vitamins A and D bearing liquids in a continuous phase consisting entirely or chiefly of gelatin. The gelatin is designed to act as a protective medium for the vitamin bearing liquids to prevent oxidation thereof which causes such vitamins to lose their valuable therapeutic and prophylactic properties. Such a preparation has the great disadvantage, however, of gradually becoming substantially indigestible because of the slow oxidation of the gelatin at the surface of the beadlets, thereby making the protective medium and consequently the vitamin bearing liquids unassimilable in vivo. It is, therefore, clear that the main problems to be overcome in the preparation of a good stable source of oil soluble vitamins are the successful dispersion of the vitamin bearing liquids or pure vitamins, and the maintenance of this dispersion in a protective medium which is not subject to deterioration.

It is, therefore, an object of this invention to provide a stable, substantially dry powder containing a colloidal dispersion of the fat soluble vitamins, which powder is readily dissolved, and the vitamins dispersed in water, milk or other aqueous liquids.

It is also an object of this invention to provide for human and animal consumption a highly assimilable, physically stable product containing a colloidal dispersion of the fat soluble vitamins, which vitamins undergo substantially no loss in potencies under normal storage conditions.

It is also an object of this invention to provide a substantially dry powder in which the finely dispersed fat soluble vitamins are encapsulated in a suitable substance serving as the continuous phase which does not become insoluble and indigestible through the action of atmospheric oxygen and therefore non-assimilable in vivo.

It is another object of this invention to provide a substantially dry powder containing the fat soluble vitamins which are maintained in a highly dispersed form in a protective medium, by means of a protective colloid, so that the substances forming the continuous phase, when mixed with water or other aqueous liquids, such as milk, will dissolve leaving the fat soluble vitamins in a physically stable dispersed condition.

It is another object to provide a substantially dry powder containing fat soluble vitamins that may be dry mixed with other suitable physiologically active substances such as water soluble synthetic vitamins, substantially dry concentrates of natural vitamins or the like.

Another object of this invention is to provide a substantially dry, stable powder, containing fat soluble vitamins dissolved in a relatively small quantity of a suitable vehicle, said vitamins possessing a very high potency and the vehicle being dispersed so that the vitamins will be more readily assimilable by individuals having an impaired intestinal absorption of fats.

Another object of this invention is to provide a substantially high concentration of water dispersible fat soluble vitamins in powder form which may be diluted with an edible powder so that daily prophylactic doses of the vitamins are contained in readily measurable volumes, that is, by teaspoon or the like, or which may be used in an undiluted form to provide massive doses of the vitamins in readily measurable volumes, or which may be diluted with the proper excipients for tablet formation.

Another object of this invention is to provide a method of preparing a substantially dry, stable powder, containing droplets of vitamin bearing liquids in a finely dispersed form which are completely encapsulated in the particles making up said powder.

Another object of this invention is to provide a method of producing a substantially dry stable vitamin preparation containing a dispersion of droplets of a vitamin bearing liquid encapsulated in an edible substance substantially impervious to atmospheric oxygen and which does not become indigestible when exposed to atmospheric oxygen.

Another object of this invention is to provide a method of stabilizing the fat soluble vitamins encapsulated in a dispersed form in a stable protective medium by providing a reserve of alkaline substances in the proper amounts in one or both of the dispersed phase and continuous phase of the emulsion so that the pH will not be less than 6 nor greater than 10, and preferably 8, when the dispersed vitamins are suspended in water by dissolution of the projective medium.

Another object of this invention is to provide a method of drying an edible material containing an emulsion of fat soluble vitamins suspended therein and a reserve of alkaline substances so that the greater portion of fat soluble vitamin particles will remain encapsulated in the interior of the fine, dried particles of a substantially amorphous form of the edible material.

The preferred procedure of carrying out this invention involves the preparation of a water soluble of gelatin produced by the alkaline hydrolysis of collagen. The vitamin bearing substance to be dispersed is prepared by adding a small amount of lecithin in alcohol, and diethanolamine, to a vitamin A concentrate of 500,000 units per gram or higher. The latter substances are added in order to regulate the negative charge of the dispersed particle and to thus aid in stabilizing the emulsion subsequently prepared. The oil, lecithin, alcohol, and diethanolamine are then added to the warm gelatin solution, which is stirred vigorously and homogenized while still warm. This primary emulsion is brought to the final volume desired by adding water which has been used to rinse the apparatus and to flush out the homogenizer. This primary emulsion is then mixed with a syrup made up of solids containing approximately 40% dextrins and 60% maltose, the pH of which has been adjusted to 8 by the addition of sodium hydroxide solution, or to which a predetermined quantity of sodium hydroxide in solution has been added, the quantity being such that the final dried powder gives a solution having a pH of substantially 8 when redissolved in water. The syrup is added in the amount necessary to provide a fat content of the final product of 5% or less.

After proper mixing the primary emulsion is thoroughly dispersed in the syrup, which then may be diluted and heated immediately prior to entering a spray dryer to adjust the viscosity to that required in the ordinary practice of spray drying. During the spray drying operation large quantities of powder are never allowed to accumulate in the receiver due to the prevailing conditions of heat and air which tend to destroy by oxidation the small proportion of vitamin A on the surface of the particles or which is imperfectly protected near the surface. As fast as small quantities of the dried material accumulate in the receiver they are transferred into an anhydrous solvent, filtered, and then washed several times by fresh solvent, petroleum ether or hexane being preferred for this purpose. The fat soluble vitamins washed from the surface of the dried product are recovered from the solvent by distillation of the solvent at a low temperature under vacuum.

This procedure insures that practically all of the vitamins either on or near the surface of the particles of dried material are reclaimed for future use. If the washing step were omitted the vitamins normally reclaimed by that step would deteriorate quite rapidly since they are not fully encapsulated. The washed product also has a much more desirable odor in most cases.

After so recovering the excess vitamin bearing oil, the powder is then dried in a shelf vacuum dryer at temperatures not exceeding 35 degrees C. to remove the last traces of the solvent. The powder now has the form of a loose cake produced by the filtering and washing process and subsequent to the vacuum drying it is placed in a fine sieve with pieces of rubber, cotton belting or leather and vibrated to re-form the dry powder.

It is desirable to use high potency vitamin concentrates both for the purpose of cutting down the percentage of fatty carriers in the preparation, which have been proven to lower the desired physiological effect, and to aid in maintaining a high continuous phase to dispersed phase ratio, thereby obtaining relatively great depths of the solid continuous phase between the dispersed particles and consequently obtaining the maximum protection possible for the dispersed particles.

The vehicles which are suitable for carrying the fat soluble vitamins are either those in which the vitamins are naturally found, such as fish liver oils, or substances having substantially the same properties. These vehicles must be capable of having natural or synthetic vitamins A and D dissolved therein, must be suitable for human consumption, and must be fatty or oily in nature.

The edible substance used as the continuous phase may take the form of sugars, dextrins, starches, proteins, amino acids or hydrolyzed protein. One of the necessary characteristics of these substances which qualifies them to be used in this product is that they may be spray dried to a substantially amorphous form which is unaffected by exposure to the atmosphere and is also substantially impervious to atmospheric oxygen. In addition, they must be edible compounds, and remain so, even after long continued exposure to the atmospheric oxygen.

There are two types of gelatin which may be used as the protective colloid, one of which is formed by the acid hydrolysis of collagen and the other by alkaline hydrolysis of collagen. Certain physical properties of these two gelatins are widely different, notable among which are the isoelectric points. It has been found preferable to use the gelatin formed by the alkaline hydrolysis, which has the lower isoelectric point, because when dissolved in an alkaline medium such as one at a pH of 8, its electric charge becomes strongly negative and therefore is the better protective colloid, in this application. At pH 8 the acid hydrolyzed gelatin is near its isoelectric point and, therefore, is the least soluble at such a pH and has an extremely weak electric charge under such conditions. Since oil and fat colloidal particles are charged strongly negative in aqueous solutions, especially if they contain lecithin, the protective colloid must also be strongly negative in charge. Suspensions of gum acacia, tragacanth and other gums are negatively charged to different degrees and may also be used as protective colloids in place of the gelatin, but the composition of gelatin is more uniform and smaller amounts are required to protect the dispersion satisfactorily.

It has been found that the vitamin A stability in the dry powder is greatly increased with the addition of a reserve of alkaline substances in the continuous and dispersed phases, in an amount such that when the powder is resuspended in water the pH will be between the limits of 6 and 10, but preferably 8. With such a pH value the dry powder can be dry mixed with finely ground synthetic water soluble vitamins or dry concentrations of natural water soluble vitamins and neither the vitamin A nor the water soluble vitamins will be rendered unstable.

In addition to the spray drying mentioned above the syrup containing the dispersion of fat soluble vitamins may be dried in fine films on a vacuum drum dryer. Such vacuum drum drying has the disadvantage, however, of leaving too large a proportion of the fat soluble vitamin dispersion on the surface of the flakes, or imperfectly protected near the surface. It does have the advantage nevertheless of producing a product which is more easily and rapidly dissolved and dispersed in water. Spray drying has the advantage, however, of encapsulating a larger percentage of the fat soluble vitamin dispersion. Either a type of spray dryer having a spray head depending upon aspiration by air pressure to form a spray, or a type having a high speed centrifugal spray-head may be used. It has been found that the latter type of spray head produces powder of more uniform size. Spray drying as used herein in the specification and claims is to be understood to means the atomization of the emulsion into a body of hot dry air to directly form the discrete particles directly therefrom.

The relative humidity of the air to which the powder is exposed in handling during the time between its removal from the vacuum shelf dryer and the packaging in air tight containers has been found to be an important factor, also, in the formation of the keeping qualities of the finished product. Although the deleterious effects of oxidation are prevented by the proper choice of materials and the mode of preparation, exposure to a humid atmosphere over a long period of time would allow the carbohydrates comprising the encapsulating medium to absorb sufficient moisture to support mold and bacterial growth which might cause spoilage of the product. This can be avoided by carrying out the packaging step in an air conditioned room in which the relative humidity has been suitably adjusted. The particular type of substance forming the continuous phase and the length of exposure to air during handling affect the relative humidity requirements considerably. For instance, the preferred maltose and dextrins mixture can be handled rapidly and packaged as powder or in capsules in a room conditioned to fifty per cent or less relative humidity. However, since more time is necessary to form tablets, it has been found that such operations should not be carried out in an air conditioned room above twenty per cent relative humidity.

In another possible form of procedure the initial dispersion of the vitamin concentrate may take the form of an emulsion formed by mixing the concentrate with water to which a surface active agent has been added to stabilize the emulsion. This emulsion is then added to a solution of the desired edible compound and the resultant suspension kept well agitated during the spray drying step.

In order to more fully explain the invention a number of specific examples are set forth. The first example given is one illustrating the preferred procedure, together with a tabulation of the results of keeping tests run on samples of the product of this particular procedure.

Example I

To 125 cc. of solution at 55° C. containing 12.5 grams of gelatin formed by alkaline hydrolysis of collagen, add with stirring 42 cc. of alcoholic solution saturated with lecithin containing 0.132 gram of activated ergosterol (12,000 units vitamin D per mg), 0.5 cc. diethanolamine, and 13.5 grams of a concentrate of natural vitamin A esters in oil (500,000 units vitamin A per gram). Homogenize the mixture to form an emulsion. Add the emulsion with vigorous stirring to 2,580 grams of syrup, with pH adjusted to 7.8 with N/2 sodium hydroxide, containing 859.2 grams of dextrins and 1228.8 grams of maltose previously warmed to 55° C. Spray dry the mixture, collecting the dry powder in a container that is absolutely dry, and avoid undue exposure to air. Wash one volume of powder with four volumes of dry petroleum ether three times to remove the oil that is not encapsulated in the powder particles. Remove the last traces of ether by drying in a shelf vacuum dryer at low temperature. Vibrate the dry powder in a sifter with a few square of cotton belting to produce a powder containing no lumps. The pH of final preparation is 7.2.

Keeping tests of vitamin A at room temperature and at 37° C.:

| Storage | Loss vitamin A, percent |
|---|---|
| 3 months room temp | nil |
| 3 months 37° | nil |

The second example illustrates the effect of a variation in the pH of the final powder on the vitamin A stability, and the desirability of having a final product with a pH of between 6 to 10.

Example II

To 250 cc. of solution at 50° C. containing 25.0 grams of gelatin formed by acid hydrolysis of collagen, add with stirring 15.0 grams of ascorbic acid, 5 grams of viosterol (700,000 units vitamin D per gram) and 27.7 grams of a concentrate of natural vitamin A esters in oil (500,000 units vitamin A per gram). Homogenize the mixture to form an emulsion. Add the emulsion with vigorous stirring to 5,000 grams of syrup containing 1,200 grams of dextrins and 1,800 grams of maltose previously warmed to 50° C. Spray dry the mixture, collecting the dry powder in a container that is absolutely dry, and avoid undue exposure to air. Wash one volume of powder with four volumes of dry petroleum ether three times to remove the oil that is not encapsulated in the power particles. Remove the last traces of ether by drying in a shelf vacuum dryer at low temperature. Vibrate the dry powder in a sifter with a few squares of cotton belting to produce a powder containing no lumps. The pH of final preparation is 5.1.

Keeping test of vitamin A at room temperature and at 37° C.:

| Storage | Loss vitamin A, percent |
|---|---|
| 3 months room temp | 7.6 |
| 3 months 37° C | 8.4 |

Example III

To 10,500 grams of syrup at 50° C. containing 2,520 grams of dextrins and 3,780 grams of maltose, add with vigorous stirring 480 grams of a fish liver oil compound containing 60,000 units vitamin A per gram and 8,500 units of vitamin D per gram, and 225 cc. polyoxyalkylene derivative of mannitan monolaurate. Keep the suspension well agitated during the spray drying. Collect the dry powder in a container that is absolutely dry and avoid undue exposure to air. The pH of the finished product is 6.6.

The last example is an illustration of how the preparation may be physically mixed with other vitamins to form a stable powder.

Example IV

Dry mix with the aid of a mechanical mixer the following:

140 grams vitamin containing powder prepared according to Example III.
0.150 gram of thiamine hydrochloride.
0.300 gram of niacinamide.
5 grams "solubilized" riboflavin (containing 8% active riboflavin).
6 grams ascorbic acid.

A keeping test of vitamins A and D, thiamine hydrochloride, riboflavin and ascorbic acid in this product at room temperature gave the following results:

| Storage | Vitamin A, u./g. | Thiamine, mg./g. | Riboflavin, mg./g. | Ascorbic, mg./g. | Vitamin D, u./g. |
|---|---|---|---|---|---|
| Original | 3,400 | 0.97 | 2.5 | 40 | 400 |
| 3 months room temp | 3,500 | 0.94 | 2.2 | 42 | 400 |

The irregularities which appear in the results of the keeping test are largely due to the inability to achieve more accurate measurements. The signfiicant part of the results is that the deterioration is negligible.

As mentioned previously, the product obtained by the above described processes is subject to very flexible use, and is far superior in this respect to vitamin liquids and powders now available. It may be used to provide massive doses of vitamins A or D or both for clincial investigations which can be administered in powder form, capsules, or diluted with water, milk, or the like, as an emulsion. When mixed with other water soluble substances it may be utilized in a similar fashion.

Specifically, it may be diluted with a powder of the same substance used to form the encapsulating medium such as the 40% dextrins and 60% maltose composition. The mixture will then be such that daily prophylactic doses may be easily measured such as by a teaspoon. Tablets may be formed by mixing the powder with excipients, with water soluble vitamins added if desired.

In regard to the stability of such mixtures, dried concentrates of the water soluble vitamins of yeast and rice polishings, as well as synthetic vitamins $B_1$, $B_2$, C and niacinamide may be blended with the powder and the mixtures are as stable as the individual components when stored separately. The same stability prevails when the power is mixed with dried protein hydrolysates and amino acids, with or without the admixture with water soluble vitamins.

Having described our invention, what we claim is:

1. The process of making a highly stable vitamin preparation in the form of a powder containing a dispersion of fat soluble vitamins which, when mixed with aqueous liquids, will dissolve leaving fat soluble vitamins in a physically stable dispersed condition, comprising the steps of preparing an emulsion in which droplets of vitamins A and B concentrate dissolved in a fatty carrier are dispersed in an aqueous solution of an edible substance consisting essentially of dextrins, sugars, and a relatively small amount of an edible protective colloid selected from the group consisting of gelatin, gum acacia and gum tragacanth for stabilizing said emulsion, and spray drying said emulsion to form a body of discrete particles in which the finely dispersed portions of said fatty carrier are substantially encapsulated by said elible substance, the proportions of said fatty carrier and said edible substance being selected so that the fat content of said discrete particles is not greater than 5% by weight.

2. The process of making a highly stable vitamin preparation in the form of a powder containing a dispersion of fat soluble vitamins which, when mixed with aqueous liquids, will dissolve leaving fat soluble vitamins in a physically stable dispersed condition, comprising the steps of preparing an emulsion in which droplets of vitamins A and D concentrate dissolved in a fatty carrier are dispersed in an aqueous solution of an edible substance consisting essentially of dextrins, sugars, and a relatively small amount of an edible protective colloid selected from the group consisting of gelatin, gum acacia and gum tragacanth for stabilizing said emulsion, adjusting the pH of said emulsion to a value in the range of 6 to 10, and spray drying said emulsion to form a body of discrete particles in which the finely dispersed portions of said fatty carrier are substantially encapsulated by said edible substance, the proportions of said fatty carrier and said edible substance being selected so that the fat content of said discrete particles is not greater than 5% by weight.

3. The process of making a highly stable vitamin preparation in the form of a powder containing a dispersion of fat soluble vitamins which, when mixed with aqueous liquids, will dissolve leaving fat soluble vitamins in a physically stable dispersed condition, comprising the steps of preparing an emulsion in which droplets of vitamins A and D concentrate dissolved in a fatty carrier are dispersed in an aqueous solution of an edible substance consisting essentially of dextrins, sugars, and a relatively small amount of an edible protective colloid selected from the group consisting of gelatin, gum acacia and gum tragacanth for stabilizing said emulsion, adjusting the pH of said emulsion to a value in the range of 6 to 10, spray drying said emulsion to form a body of discrete particles in which the finely dispersed portions of said fatty carrier are substantially encapsulated by said edible substance, the proportions of said fatty carrier and said edible substance being selected so that the fat content of said discrete particles is not greater than 5% by weight, and washing said body of discrete particles with an anhydrous oil solvent.

4. The process of making a highly stable vitamin preparation in the form of a powder containing a dispersion of fat soluble vitamins which, when mixed with aqueous liquids, will dissolve leaving fat soluble vitamins in a physically stable dispersed condition, comprising the steps of preparing an emulsion in which droplets of vitamins A and D concentrate dissolved in a fatty carrier are dispersed in an aqueous solution of an edible substance consisting essentially of dextrins, maltose, and a relatively small amount of an edible protective colloid selected from the group consisting of gelatin, gum acacia and gum tragacanth for stabilizing said emulsion, and spray drying said emulsion to form a body of discrete particles in which the finely dispersed portions of said fatty carrier are substantially encapsulated by said edible substance, the proportions of said fatty carrier and said edible substance being selected so that the fat content of said discrete particles is not greater than 5% by weight.

5. The process of making a highly stable vitamin preparation in the form of a powder containing a dispersion of fat soluble vitamins which, when mixed with aqueous liquids, will dissolve leaving fat soluble vitamins in a physically stable dispersed condition, comprising the steps of preparing an emulsion in which droplets of vitamins A and D concentrate dissolved in a fatty carrier are dispersed in an aqueous solution of an edible substance consisting essentially of dextrins, maltose, and a relatively small amount of an edible protective colloid selected from the group consisting of gelatin, gum acacia and gum tragacanth for stabilizing said emulsion, adjusting the pH of said emulsion to a value in the range of 6 to 10, spray drying said emulsion to form a body of discrete particles in which the finely dispersed portions of said fatty carrier are substantially encapsulated by said edible substance, the proportions of said fatty carrier and said edible substance being selected so that the fat content of said discrete particles is not greater than 5% by weight, and washing said body of discrete particles with an anhydrous oil solvent.

6. A vitamin preparation made in accordance with the process of claim 1, further characterized as comprising discrete particles which are substantially impervious to atmospheric oxygen and substantially unaffected thereby to impair their assimilability in vivo and in which the finely dispersed droplets of vitamin A and D concentrate dissolved in the fatty carrier are encapsulated in the edible substance so as to render the same substantially impenetrable to anhydrous oil solvents.

7. A vitamin preparation made in accordance with the process of claim 2, further characterized as comprising discrete particles which are substantially impervious to atmospheric oxygen and substantially unaffected thereby to impair their assimilability in vivo and in which the finely dispersed droplets of vitamin A and D concentrate dissolved in the fatty carrier are encapsulated in the edible substance so as to render the same substantially impenetrable to anhydrous oil solvents.

8. A vitamin preparation made in accordance with the process of claim 3, further characterized as comprising discrete particles which are substantially impervious to atmospheric oxygen and substantially unaffected thereby to impair their assimilability in vivo and in which the finely dispersed droplets of vitamin A and D concentrate dissolved in the fatty carrier are encapsulated in the edible substance so as to render the same substantially impenetrable to anhydrous oil solvents.

9. A vitamin preparation made in accordance with the process of claim 4, further characterized as comprising discrete particles which are substantially impervious to atmospheric oxygen and substantially unaffected thereby to impair their assimilability in vivo and in which the finely dispersed droplets of vitamin A and D concentrate dissolved in the fatty carrier are encapsulated in the edible substance so as to render the same substantially impenetrable to anhydrous oil solvents.

10. A vitamin preparation made in accordance with the process of claim 5, further characterized as comprising discrete particles which are substantially impervious to atmospheric oxygen and substantially unaffected thereby to impair their assimilability in vivo and in which the finely dispersed droplets of vitamin A and D concentrate dissolved in the fatty carrier are encapsulated in the edible substance so as to render the same substantially impenetrable to anyhdrous oil solvents.

11. The process of making a vitamin preparation in the form of a powder containing a dispersion of fat soluble vitamins comprising the steps of preparing an emulsion in which droplets of vitamin A and D concentrate dissolved in a fatty carrier are dispersed in an aqueous solution of an edible substance consisting essentially of dextrims, sugars, and gum acacia and spray drying said emulsion to form a body of discrete particles in which the finely dispersed portions of said fatty carrier are substantially encapsulated by said edible substance.

12. The process of making a vitamin preparation in the form of a powder containing a dispersion of fat soluble vitamins comprising the steps of preparing an emulsion in which droplets of vitamin A and D concentrate dissolved in a fatty carrier are dispersed in an aqueous solution of an edible substance consisting essentially of dextrims, sugars, and an edible vegetable gum, and spray drying said emulsion to form a body of discrete particles in which the finely dispersed portions of said fatty carrier are substantially encapsulated by said edible substance.

JOHN CLARENCE WALLENMEYER.
FRANCIS GUY McDONALD.
ROBERT LLOYD HENRY.

References Cited in the file of this patent

UNITED STATES PATENTS

| Number | Name | Date |
|---|---|---|
| 1,663,323 | Whatmough | Mar. 20, 1928 |
| 2,183,053 | Taylor | Dec. 12, 1939 |
| 2,206,113 | Nitardy | July 2, 1940 |
| 2,218,592 | Taylor | Oct. 22, 1940 |
| 2,283,531 | Briod et al. | May 19, 1942 |
| 2,321,400 | Lubarsky | June 8, 1943 |
| 2,348,503 | Taylor | May 9, 1944 |
| 2,356,350 | Peters et al. | Aug. 22, 1944 |
| 2,358,870 | Maurer | Sept. 26, 1944 |
| 2,410,110 | Taylor | Oct. 29, 1946 |

FOREIGN PATENTS

| Number | Country | Date |
|---|---|---|
| 564,895 | Great Britain | Oct. 18, 1944 |
| 533,323 | Great Britain | Feb. 11, 1941 |
| 394,182 | Great Britain | June 22, 1933 |
| 301,651 | Great Britain | Dec. 12 1939 |